(12) United States Patent
Nagata et al.

(10) Patent No.: US 6,593,257 B1
(45) Date of Patent: *Jul. 15, 2003

(54) GLASS-CERAMIC COMPOSITION FOR RECORDING DISK SUBSTRATE

(75) Inventors: Hideki Nagata, Kobe (JP); Hideki Kawai, Nishinomiya (JP); Toshiharu Mori, Settsu (JP); Hiroshi Yuki, Shiga-Ken (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/610,337

(22) Filed: Jul. 5, 2000

(30) Foreign Application Priority Data

Jul. 6, 1999 (JP) ............................ 11-191747

(51) Int. Cl.⁷ ..................... C03C 10/04; C03C 10/14
(52) U.S. Cl. ..................... 501/4; 501/5; 428/694 ST
(58) Field of Search ................... 501/4, 5; 428/694 ST, 428/694 SG

(56) References Cited

U.S. PATENT DOCUMENTS

| | | | |
|---|---|---|---|
| 4,042,362 A | 8/1977 | MacDowell et al. | |
| 4,304,603 A | 12/1981 | Grossman et al. | 501/9 |
| 4,374,931 A | 2/1983 | Courbin et al. | |
| 4,714,687 A | 12/1987 | Holleran et al. | 501/9 |
| 5,219,799 A | 6/1993 | Beall et al. | 501/5 |
| 5,352,638 A | 10/1994 | Beall et al. | 501/10 |
| 5,391,522 A | 2/1995 | Goto et al. | 501/4 |
| 5,476,821 A | 12/1995 | Beall et al. | 501/10 |
| 5,489,558 A | 2/1996 | Moffatt et al. | 501/69 |
| 5,491,116 A | 2/1996 | Beall et al. | 501/5 |
| 5,567,217 A | 10/1996 | Goto et al. | 65/33.1 |
| 5,580,363 A | 12/1996 | Goto et al. | 65/29.18 |
| 5,626,935 A | 5/1997 | Goto et al. | 428/64.1 |
| 5,676,721 A | 10/1997 | Fredholm et al. | |
| 5,691,256 A * | 11/1997 | Taguchi et al. | 501/5 |
| 5,726,108 A | 3/1998 | Taguchi et al. | |
| 5,786,286 A | 7/1998 | Kohli | 501/8 |
| 5,866,489 A | 2/1999 | Yamaguchi | 501/4 |
| 5,872,069 A | 2/1999 | Abe | 501/5 |
| 5,874,376 A * | 2/1999 | Taguchi et al. | 501/5 |
| 5,910,459 A | 6/1999 | Beall et al. | 501/8 |
| 5,968,219 A | 10/1999 | Gille et al. | |
| 6,086,977 A * | 7/2000 | Suzuki et al. | 501/5 |
| 6,174,827 B1 * | 1/2001 | Goto et al. | 501/4 |
| 6,182,472 B1 | 2/2001 | Fredholm et al. | |
| 6,187,441 B1 * | 2/2001 | Takeuchi et al. | 428/410 |
| 6,270,876 B1 * | 8/2001 | Abe et al. | 501/4 |
| 6,284,340 B1 * | 9/2001 | Abe et al. | 501/4 |
| 6,287,663 B1 * | 9/2001 | Goto | 501/4 |
| 6,372,319 B1 * | 4/2002 | Abe et al. | 501/4 |
| 6,387,509 B1 * | 5/2002 | Goto et al. | 501/4 |

FOREIGN PATENT DOCUMENTS

| | | |
|---|---|---|
| JP | 9-208260 | 8/1997 |
| JP | 9-314458 | 12/1997 |
| JP | 10-208226 | 8/1998 |
| JP | 10-226532 | 8/1998 |
| JP | 11-16142 | 1/1999 |
| JP | 11-16143 | 1/1999 |
| JP | 11-322362 | 11/1999 |

* cited by examiner

*Primary Examiner*—Karl Group
(74) *Attorney, Agent, or Firm*—Burns, Doane, Swecker & Mathis, LLP

(57) ABSTRACT

A glass ceramics composition for recording disk substrate consists essentially, expressed in terms of weight percent on the oxide basis, of from 65 to 80 wt % of $SiO_2$, from 3 to 15 wt % of $Al_2O_3$, from 3 to 15 wt % of $Li_2O$, from 0.2 to 5 wt % of $P_2O_5$, and from 0.1 to 15 wt % of $ZrO_2$, wherein a value of $ZrO_2/P_2O_5$ is within a range from 1.1 to 8.5, expressed in terms of weight percent on the oxide basis.

25 Claims, No Drawings

GLASS-CERAMIC COMPOSITION FOR RECORDING DISK SUBSTRATE

RELATED APPLICATION

This application is based on application No. 11-191747 Jul. 6, 1999 filed in Japan, the content of which is hereby incorporated by reference.

FIELD OF THE INVENTION

The present invention relates to a glass ceramic composition, more particularly, relates to the glass ceramic composition suitable for magnetic disk substrate.

DESCRIPTION OF THE PRIOR ART

Magnetic disks are mainly used as recording media of computers. Aluminum alloys have heretofore been used as the material of magnetic disk substrates. However, in the recent trend for a smaller size, a thinner thickness, and a higher recording density of magnetic disks, a higher surface flatness and a higher surface smoothness are increasingly desired. Aluminum alloys cannot satisfy the desire, and a material for magnetic disk substrates which can replace aluminum alloys is required. Thus, in particular, recent attention has been focused on the glass substrate for the disk because of its surface flatness and smoothness and excellent mechanical strength.

As glass substrates for disks for recording media, there have been proposed a chemically reinforced glass substrate having a surface reinforced by ion exchange or like method and a glass ceramics substrate on which a crystal component has been precipitated to reinforce the bonding. In recent years, the latter crystallized glass substrate in which a crystallite has been precipitated in glass by heat treatment has drawn particular attention because of its excellent strength and high productivity.

As recent requirements on the performance of a disk for a recording medium have been more stringent, a substrate material has also been required to have an increased strength related directly to the bending or warping of the disk during high-speed rotation. The strength can be represented by the elastic modulus ratio (=Young's modulus/specific gravity) of the substrate material. The elastic modulus ratio having a higher value indicates a higher mechanical strength. However, a glass-ceramics composition conventionally known has the problem that the productivity thereof is reduced significantly if the strength thereof is to be increased.

SUMMARY OF THE INVENTION

It is an object of the present invention to provide a glass ceramic composition which is suitable for use in an improved glass substrate for a recording medium.

Another object of the present invention is to provide a glass ceramic composition which has high productivity irrespective of its high elastic modulus ratio.

Still another object of the present invention is to provide a disk substrate for a recording medium which has high productivity irrespective of its high elastic modulus ratio.

Thus, the present invention provides a glass ceramics composition for recording disk substrate consisting essentially, expressed in terms of weight percent on the oxide basis, of from 65 to 80 wt % of $SiO_2$, from 3 to 15 wt % of $Al_2O_3$, from 3 to 15 wt % of $Li_2O$, from 0.2 to 5 wt % of $P_2O_5$, and from 0.1 to 15 wt % of $ZrO_2$, wherein a value of $ZrO_2/P_2O_5$ is within a range from 1.1 to 8.5, expressed in terms of weight percent on the oxide basis.

DESCRIPTION OF THE PREFERRED EMBODIMENT

The present invention provides a glass ceramics composition for recording disk substrate consisting essentially, expressed in terms of weight percent on the oxide basis, of from 65 to 80 wt % of $SiO_2$, from 3 to 15 wt % of $Al_2O_3$, from 3 to 15 wt % of $Li_2O$, from 0.2 to 5 wt % of $P_2O_5$, and from 0.1 to 15 wt % of $ZrO_2$, wherein a value of $ZrO_2/P_2O_5$ is within a range from 1.1 to 8.5, expressed in terms of weight percent on the oxide basis.

In the composition, $SiO_2$ is a glass network former oxide. The melting properties deteriorate if the proportion thereof is lower than 65 wt %. If the proportion thereof exceeds 80 wt %, the composition becomes stable as glass so that the crystal is less likely to be precipitated.

$Al_2O_3$ is a glass intermediate oxide and a component of an aluminum borate crystal, which is a crystalline phase precipitated by heat treatment. If the proportion of $Al_2O_3$ is lower than 3 wt %, the crystal is precipitated in reduced quantity and a sufficient strength is not achieved. If the composition rate of $Al_2O_3$ exceeds 15 wt %, the melting temperature is increased and devitrification is more likely to occur.

$Li_2O$ is a fluxing agent and a component a component of a lithium disilicate crystal, which is a crystalline phase precipitated by heat treatment. If the proportion of $Li_2O$ is lower than 3 wt %, the precipitation amount of lithium disilicate crystal is insufficient. If the composition rate of $Li_2O$ exceeds 15 wt %, a lithium disilicate crystal, which is a crystalline phase precipitated by heat treatment is not stable so that the crystallization process cannot be controlled. In addition, the chemical durability is reduced, which may affect a magnetic film, while the stability in the polishing to cleaning steps is lowered.

$P_2O_5$ is a fluxing agent and a nuclear forming agent for precipitating a silicate crystal, which is an important component for uniformly precipitating the crystal over the entire glass. If the proportion of $P_2O_5$ is lower than 0.2 wt %, satisfactory nuclei are less likely to be formed so that crystal grains are increased in size or the crystal is precipitated non-uniformly. Consequently, an extremely small and uniform crystal structure is less likely to be obtained and a flat, smooth surface required of the glass substrate as a disk substrate cannot be obtained by polishing. If the proportion of $P_2O_5$ exceeds 5 wt %, the reactivity of the glass in a molten state to a filter medium is increased and the devitrifiability thereof is also increased, so that productivity during melt molding is reduced. In addition, the chemical durability is reduced, which may affect a magnetic film, while the stability in the polishing to cleaning steps is lowered.

$ZrO_2$ is a glass intermediate oxide and a nuclear forming agent. In particular, $ZrO_2$ holds the precipitation of a quartz crystal in crystal. If the proportion of $ZrO_2$ is lower than 0.1 wt %, satisfactory crystal nuclei are less likely to be formed so that crystal grains are increased in size and the crystal is precipitated non-uniformly. This prevents the obtention of an extremely small and uniform crystal structure and the obtention of a flat, smooth surface by polishing, which is required of the glass substrate as a disk substrate. In addition, the chemical durability and the migration resistance are reduced. This may affect a magnetic film and degrades stability in the polishing to cleaning steps. If the proportion of $ZrO_2$ exceeds 15 wt %, the melting temperature is increased and devitrification is more likely to occur during melt molding, which lowers productivity. Moreover, the precipitated crystalline phase changes so that desired characteristics are less likely to be obtained.

A value of $ZrO_2/P_2O_5$ is a parameter which decides precipitation ratio between a quartz crystal and a lithium disilicate crystal. If the value is lower than 1.1, it is difficult to precipitate the quartz crystal so that desired characteristics are less likely to be obtained. If the value exceeds 8.5, it is difficult to precipitate the lithium disilicate crystal so that desired characteristics are less likely to be obtained.

Besides the above-mentioned basic components, CaO as a fluxing agent can been added. By adding CaO serving as a fluxing agent, a melting property and a stable crystal phase are improved. If the proportion of CaO is lower than 0.1 wt %, a melting property does not sufficiently improve. If the proportion thereof exceeds 5 wt %, the composition becomes stable as glass so that the crystal is less likely to be precipitated and a sufficient strength is not achieved.

Besides the above-mentioned basic components, $K_2O$ as a fluxing agent can been added. By adding $K_2O$ serving as a fluxing agent $K_2O$, the production stability is improved. If the proportion of $K_2O$ is lower than 0.1 wt %, however, the melting properties are not improved sufficiently. If the proportion of $K_2O$ exceeds 5 wt %, the glass becomes stable and the crystallization is suppressed, while the chemical durability is reduced. This may affect a magnetic film and degrades stability in the polishing to cleaning steps.

Besides the above-mentioned basic components, $Sb_2O_3$ as a fluxing agent can been added. By adding $Sb_2O_3$ serving as a fluxing agent, production stability has been improved. If the proportion of $Sb_2O_3$ is lower than 0.1 wt %, however, a sufficient clarifying effect can not be achieved and the productivity is lowered. If the proportion of $Sb_2O_3$ exceeds 5 wt %, the crystallization of the glass becomes unstable and the precipitated crystalline phase cannot be controlled so that required characteristics are less likely to be obtained.

Besides the above-mentioned basic components, $B_2O_3$ as a former can been added. By adding $B_2O_3$ serving as a former, the phase splitting of the glass is promoted and the precipitation and growth of the crystal are promoted. If the proportion of $B_2O_3$ is lower than 0.1 wt %, the melting properties are not improved sufficiently. If the proportion of $B_2O_3$ exceeds 15 wt %, devitrification is more likely to occur and molding becomes difficult, while the crystal is increased in size, so that an extremely small crystal is no more obtained.

Besides the above-mentioned basic components, MgO as a fluxing agent can been added. By adding MgO serving as a fluxing agent, the crystal in the form of grains aggregates to form an aggregation of crystal grains. If the proportion of MgO is lower than 0.1 wt %, the range of operating temperatures is narrowed down and the chemical durability of a glass matrix phase is not improved. If the proportion of MgO exceeds 12 w%, another crystalline phase is precipitated so that it becomes difficult to achieve a desired strength.

Besides the above-mentioned basic components, BaO as a fluxing agent can been added. By adding BaO serving as a fluxing agent, production stability has been improved. If the proportion of BaO is lower than 0.1 wt %, however, the melting properties are not improved sufficiently. If the proportion of BaO exceeds 5 wt %, the glass becomes stable and the crystallization is suppressed so that it becomes difficult to achieve a desired strength.

Besides the above-mentioned basic components, ZnO as a fluxing agent can been added. By adding ZnO serving as a fluxing agent, it helps uniform precipitation of the crystal. If the proportion of ZnO is lower than 0.1 wt %, however, the uniformity of the crystal is not sufficiently improved. If the proportion of ZnO exceeds 5 wt %, the glass becomes stable and the crystallization is suppressed, so that required strength is less likely to be achieved.

Besides the above-mentioned basic components, $Nb_2O_5$ as a fluxing agent can been added. By adding $Nb_2O5$ serving as a fluxing agent, a material serving as a crystal nucleating agent is increased. If the proportion of $Nb_2O_5$ is lower than 0.1 wt %, the rigidity is not sufficiently improved. If the proportion of $Nb_2O_5$ exceeds 5 wt %, the crystallization of the glass becomes unstable and the precipitated crystalline phase cannot be controlled, so that desired characteristics are less likely to be obtained.

Besides the above-mentioned basic components, $Ta_2O_5$ as a fluxing agent can been added. By adding $Ta_2O_5$ serving as a fluxing agent, the melting properties and strength are improved, while the chemical durability of the glass matrix phase is improved. If the proportion of $Ta_2O_5$ is lower than 0.1 wt %, however, the rigidity is not sufficiently improved. If the proportion of $Ta_2O_5$ exceeds 5 wt %, the crystallization of the glass becomes unstable and the precipitated crystalline phase cannot be controlled, so that desired characteristics are less likely to be obtained.

Besides the above-mentioned basic components, $La_2O_3$ as a fluxing agent can been added. By adding $La_2O_3$ serving as a fluxing agent, the precipitation of the crystal is suppressed. If the proportion of $La_2O_3$ is lower than 0.1 wt %, however, the rigidity is not improved sufficiently. If the proportion of $La_2O_3$ exceeds 5 wt %, the crystallization of the glass becomes unstable and the precipitated crystalline phase cannot be controlled, so that required properties are less likely to be obtained.

Next, a description will be given to a fabrication method. Raw materials containing the main components of the glass substrate to be finally produced are sufficiently mixed in specified proportions. The resulting mixture is placed in a platinum crucible and caused to melt. The molten product is cast in a metal mold so that it is formed into a rough configuration and annealed to a room temperature. The molten product is then held at a specified temperature for a specified time during a primary treatment (heat treatment) such that crystal nuclei are formed. Subsequently, the molded mixture is held at a specified temperature for a specified time during a secondary heat treatment such that crystal nuclei grow. By slowly cooling the molded mixture, an objective crystallized glass is obtained.

NUMERICAL EXAMPLES

A description will be given next to specific numerical examples incorporating the embodiments. In Table 1: the proportions(unit: wt %) of materials composing the glasses of the examples 1–4; the melting temperatures and times; the primary heat treatment temperatures and times; the secondary heat treatment temperatures and times; the main precipitated crystalline phases; the subordinate precipitated crystalline phases; the mean diameters of the crystal grains; the specific gravity s: the Young's moduli; and the specific moduli. Likewise, the glasses of the examples 5–8 are shown in Table 2. Likewise, the glasses of the examples 9–12 are shown in Table 3. Likewise, the glasses of the examples 13–16 are shown in Table 4. Likewise, the glasses of the examples 17–20 are shown in Table 5. Likewise, the glasses of the examples 21–24 are shown in Table 6.

TABLE 1

|  | Example 1 | Example 2 | Example 3 | Example 4 |
|---|---|---|---|---|
| $SiO_2$ | 74.6 | 72.5 | 75.5 | 73.5 |
| $Al_2O_3$ | 6.5 | 7.2 | 10.8 | 8.0 |
| $Li_2O$ | 8.5 | 3.6 | 8.5 | 8.5 |
| $P_2O_5$ | 2.0 | 2.0 | 2.4 | 3.0 |
| $ZrO_2$ | 3.5 | 8.0 | 2.8 | 7.0 |
| CaO | 2.9 | 2.2 |  |  |
| $K_2O$ | 1.5 | 3.0 |  |  |
| $Sb_2O_3$ | 0.5 | 1.5 |  |  |
| $Zr2/P_2O_5$ | 1.8 | 4.0 | 1.2 | 2.3 |
| Melting Temperatures (°C.) | 1480 | 1540 | 1460 | 1500 |
| Melting Times (hours) | 2.50 | 1.75 | 2.50 | 2.00 |
| Primary Heat Treatment Temperatures (°C.) | 580 | 580 | 580 | 575 |
| Primary Heat Treatment Times (hours) | 5.00 | 5.00 | 5.00 | 5.50 |
| Secondary Heat Treatment Temperatures (°C.) | 700 | 700 | 690 | 700 |
| Secondary Heat Treatment Times (hours) | 3.00 | 3.00 | 2.50 | 3.00 |
| Main Precipitated Crystalline Phase | Lithium disilicate | Quartz | Lithium disilicate | Lithium disilicate |
| Subordinate Precipitated Crystalline Phase | Quartz | Lithium disilicate | Quartz | Quartz |
| Mean Diameters of the Crystal Grains (μm) | 0.06 | 0.06 | 0.06 | 0.06 |
| Specific Gravity | 2.52 | 2.94 | 2.40 | 2.63 |
| Young's Module | 97.9 | 100.6 | 93.3 | 95.1 |
| Specific Module | 38.8 | 34.2 | 38.9 | 36.2 |

TABLE 2

|  | Example 5 | Example 6 | Example 7 | Example 8 |
|---|---|---|---|---|
| $SiO_2$ | 72.0 | 75.5 | 67.0 | 69.0 |
| $Al_2O_3$ | 10.5 | 11.2 | 10.5 | 10.2 |
| $Li_2O$ | 10.5 | 7.8 | 9.5 | 9.0 |
| $P_2O_5$ | 3.0 | 1.5 | 4.0 | 3.8 |
| $ZrO_2$ | 3.5 | 2.0 | 8.0 | 5.0 |
| CaO | 0.5 | 2.0 |  |  |
| $K_2O$ |  |  | 1.0 | 3.0 |
| $Zr2/P_2O_5$ | 1.2 | 1.3 | 2.0 | 1.3 |
| Melting Temperatures (°C.) | 1460 | 1460 | 1460 | 1480 |
| Melting Times (hours) | 2.50 | 2.50 | 2.50 | 2.50 |
| Primary Heat Treatment Temperatures (°C.) | 575 | 585 | 570 | 575 |
| Primary Heat Treatment Times (hours) | 5.50 | 5.00 | 5.50 | 5.50 |
| Secondary Heat Treatment Temperatures (°C.) | 700 | 690 | 720 | 720 |
| Secondary Heat Treatment Times (hours) | 3.00 | 2.50 | 4.00 | 4.00 |
| Main Precipitated Crystalline Phase | Lithium disilicate | Quartz | Lithium disilicate | Lithium disilicate |
| Subordinate Precipitated Crystalline Phase | Quartz | Lithium disilicate | Quartz | Quartz |
| Mean Diameters of the Crystal Grains (μm) | 0.08 | 0.08 | 0.08 | 0.08 |
| Specific Gravity | 2.41 | 2.38 | 2.67 | 2.54 |
| Young's Module | 91.2 | 92.0 | 99.2 | 94.5 |
| Specific Module | 37.9 | 38.6 | 37.1 | 37.2 |

TABLE 3

|  | Example 9 | Example 10 | Example 11 | Example 12 |
|---|---|---|---|---|
| $SiO_2$ | 74.0 | 73.8 | 72.8 | 72.0 |
| $Al_2O_2$ | 9.8 | 9.5 | 9.5 | 11.2 |
| $Li_2O$ | 8.7 | 11.5 | 9.0 | 9.8 |
| $P_2O_5$ | 2.5 | 1.2 | 2.2 | 1.5 |
| $ZrO_2$ | 4.5 | 2.5 | 4.5 | 2.5 |
| $Sb_2O_3$ | 0.5 | 1.5 |  |  |
| $B_2O_3$ |  |  | 2.0 | 3.0 |
| $ZrO_2/P_2O_5$ | 1.8 | 2.1 | 2.0 | 1.7 |
| Melting Temperatures (°C.) | 1480 | 1460 | 1460 | 1460 |
| Melting Times (hours) | 2.50 | 2.50 | 2.50 | 2.50 |
| Primary Heat Treatment Temperatures (°C.) | 580 | 585 | 580 | 585 |
| Primary Heat Treatment Times (hours) | 5.00 | 5.00 | 5.00 | 5.00 |
| Secondary Heat Treatment Temperatures (°C.) | 700 | 700 | 700 | 700 |
| Secondary Heat Treatment Times (hours) | 3.00 | 3.00 | 3.00 | 3.00 |
| Main Precipitated Crystalline Phase | Lithium disilicate | Lithium disilicate | Lithium disilicate | Lithium disilicate |
| Subordinate Precipitated Crystalline Phase | Quartz | Quartz | Quartz | Quartz |
| Mean Diameters of the Crystal Grains (μm) | 0.07 | 0.07 | 0.08 | 0.08 |
| Specific Gravity | 2.53 | 2.45 | 2.45 | 2.31 |
| Young's Module | 94.0 | 92.4 | 92.7 | 90.6 |
| Specific Module | 37.2 | 37.8 | 37.8 | 39.2 |

TABLE 4

|  | Example 13 | Example 14 | Example 15 | Example 16 |
|---|---|---|---|---|
| $SiO_2$ | 70.0 | 74.2 | 76.8 | 75.5 |
| $Al_2O_3$ | 10.2 | 9.8 | 9.6 | 9.6 |
| $Li_2O$ | 9.5 | 8.0 | 5.7 | 8.4 |
| $P_2O_5$ | 3.0 | 1.5 | 1.2 | 1.0 |
| $ZrO_2$ | 6.3 | 2.5 | 4.7 | 2.5 |
| MgO | 1.0 | 4.0 |  |  |
| BaO |  |  | 2.0 | 3.0 |
| $ZrO_2/P_2O_5$ | 2.1 | 1.7 | 3.9 | 2.5 |
| Melting Temperatures (°C.) | 1480 | 1460 | 1520 | 1500 |
| Melting Times (hours) | 2.50 | 2.50 | 1.75 | 2.00 |
| Primary Heat Treatment Temperatures (°C.) | 575 | 585 | 585 | 585 |
| Primary Heat Treatment Times (hours) | 5.50 | 5.00 | 5.00 | 5.00 |
| Secondary Heat Treatment Temperatures (°C.) | 700 | 700 | 690 | 690 |
| Secondary Heat Treatment Times (hours) | 3.00 | 3.00 | 2.50 | 2.50 |
| Main Precipitated Crystalline Phase | Lithium disilicate | Quartz | Quartz | Quartz |
| Subordinate Precipitated Crystalline Phase | Quartz | Lithium disilicate | Lithium disilicate | Lithium disilicate |
| Mean Diameters of the Crystal Grains (μm) | 0.08 | 0.08 | 0.08 | 0.08 |
| Specific Gravity | 2.57 | 2.38 | 2.74 | 2.66 |
| Young's Module | 98.1 | 92.9 | 98.8 | 97.4 |
| Specific Module | 38.2 | 39.1 | 36.1 | 36.6 |

TABLE 5

|  | Example 17 | Example 18 | Example 19 | Example 20 |
|---|---|---|---|---|
| $SiO_2$ | 74.5 | 73.2 | 73.2 | 72.0 |
| $Al_2O_3$ | 8.8 | 8.8 | 10.7 | 12.9 |
| $Li_2O$ | 6.9 | 9.8 | 10.1 | 10.4 |
| $P_2O_5$ | 4.0 | 2.5 | 2.5 | 0.5 |
| $ZrO_2$ | 5.5 | 3.7 | 3.0 | 2.7 |
| ZnO | 0.3 | 2.0 |  |  |
| $Nb_2O_5$ |  |  | 0.5 | 1.5 |
| $ZrO_2/P_2O_5$ | 1.4 | 1.5 | 1.2 | 5.4 |
| Melting Temperatures (° C.) | 1480 | 1460 | 1460 | 1460 |
| Melting Times (hours) | 2.50 | 2.50 | 2.50 | 2.50 |
| Primary Heat Treatment Temperatures (° C.) | 570 | 580 | 580 | 600 |
| Primary Heat Treatment Times (hours) | 5.50 | 5.00 | 5.00 | 4.50 |
| Secondary Heat Treatment Temperatures (° C.) | 700 | 700 | 700 | 700 |
| Secondary Heat Treatment Times (hours) | 3.00 | 3.00 | 3.00 | 3.00 |
| Main Precipitated Crystalline Phase | Quartz | Lithium disilicate | Lithium disilicate | Lithium disilicate |
| Subordinate Precipitated Crystalline Phase | Lithium disilicate | Quartz | Quartz | Quartz |
| Mean Diameters of the Crystal Grains (μm) | 0.08 | 0.08 | 0.08 | 0.08 |
| Specific Gravity | 2.59 | 2.49 | 2.41 | 2.43 |
| Young's Module | 95.2 | 90.1 | 88.1 | 89.6 |
| Specific Module | 36.8 | 36.2 | 36.6 | 36.8 |

TABLE 6

|  | Example 21 | Example 22 | Example 23 | Example 24 |
|---|---|---|---|---|
| $SiO_2$ | 77.0 | 68.5 | 73.5 | 67.3 |
| $Al_2O_3$ | 8.5 | 9.8 | 9.5 | 9.7 |
| $Li_2O$ | 8.5 | 10.7 | 10.0 | 10.0 |
| $P_2O_5$ | 2.0 | 3.0 | 2.5 | 4.0 |
| $ZrO_2$ | 2.8 | 4.0 | 3.5 | 5.0 |
| $Ta_2O_5$ | 1.2 | 4.0 |  |  |
| $La_2O_3$ |  |  | 1.0 | 4.0 |
| $ZrO_2/P_2O_5$ | 1.4 | 1.3 | 1.4 | 1.3 |
| Melting Temperatures (° C.) | 1480 | 1540 | 1480 | 1540 |
| Melting Times (hours) | 2.50 | 1.75 | 2.50 | 1.75 |
| Primary Heat Treatment Temperatures (° C.) | 580 | 575 | 580 | 570 |
| Primary Heat Treatment Times (hours) | 5.00 | 5.50 | 5.00 | 5.50 |
| Secondary Heat Treatment Temperatures (° C.) | 690 | 720 | 700 | 720 |
| Secondary Heat Treatment Times (hours) | 2.50 | 4.00 | 3.00 | 4.00 |
| Main Precipitated Crystalline Phase | Lithium disilicate | Lithium disilicate | Lithium disilicate | Lithium disilicate |
| Subordinate Precipitated Crystalline Phase | Quartz | Quartz | Quartz | Quartz |
| Mean Diameters of the Crystal Grains (μm) | 0.08 | 0.08 | 0.08 | 0.08 |
| Specific Gravity | 2.56 | 2.95 | 2.50 | 2.87 |
| Young's Module | 94.0 | 98.2 | 93.2 | 102.9 |
| Specific Module | 36.8 | 33.3 | 37.2 | 35.8 |

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A glass ceramics composition for recording disk substrate consisting essentially, expressed in terms of weight percent on an oxide basis, of from 65 to 80 wt % of $SiO_2$, from 9.5 to 15 wt % of $Al_2O_3$, from 3 to 15 wt % of $Li_2O$, from 0.2 to 5 wt % of $P_2O_5$, and from 0.22 to 15 wt % of $ZrO_2$, wherein a value of $ZrO_2/P_2O_5$ is within a range from 1.1 to 8.5, expressed in terms of weight percent on the oxide basis.

2. A glass ceramics composition as claimed in claim 1, wherein said glass ceramic composition further consists essentially, expressed in terms of weight percent on the oxide basis, of from 0.1 to 5 wt % of CaO.

3. A glass ceramics composition as claimed in claim 1, wherein said glass ceramic composition further consists essentially, expressed in terms of weight percent on the oxide basis, of from 0.1 to 5 wt % of $K_2O$.

4. A glass ceramics composition as claimed in claim 1, wherein said glass ceramic composition further consists essentially, expressed in terms of weight percent on the oxide basis, of from 0.1 to 5 wt % of $Sb_2O_3$.

5. A glass ceramics composition as claimed in claim 1, wherein said glass ceramic composition further consists.essentially, expressed in terms of weight percent on the oxide basis, of from 0.1 to 15 wt % of $B_2O_3$.

6. A glass ceramics composition as claimed in claim 1, wherein said glass ceramic composition further consists essentially, expressed in terms of weight percent on the oxide basis, of from 0.1 to 12 wt % of MgO.

7. A glass ceramics composition as claimed in claim 1, wherein said glass ceramic composition further consists essentially, expressed in terms of weight percent on the oxide basis, of from 0.1 to 5 wt % of BaO.

8. A glass ceramics composition as claimed in claim 1, wherein said glass ceramic composition further consists essentially, expressed in terms of weight percent on the oxide basis, of from 0.1 to 5 wt % of ZnO.

9. A glass ceramics composition as claimed in claim 1, wherein said glass ceramic composition further consists essentially, expressed in terms of weight percent on the oxide basis, of from 0.1 to 5 wt % of $Nb_2O_5$.

10. A glass ceramics composition as claimed in claim 1, wherein said glass ceramic composition further consists essentially, expressed in terms of weight percent on the oxide basis, of from 0.1 to 5 wt % of $Ta_2O_5$.

11. A glass ceramics composition as claimed in claim 1, wherein said glass ceramic composition further consists essentially, expressed in terms of weight percent on the oxide basis, of from 0.1 to 5 wt % of $La_2O_3$.

12. A glass ceramic recording disk substrate, wherein the glass ceramic is prepared from a composition consisting essentially, expressed in terms of weight percent on the oxide basis, of from 65 to 80 wt % of $SiO_2$, from 9.5 to 15 wt % of $Al_2O_3$, from 3 to 15 wt % of $Li_2O$, from 0.2 to 5 wt % of $P_2O_5$, and from 0.22 to 15 wt % of $ZrO_2$, wherein a value of $ZrO_2/P_2O_5$ is within a range from 1.1 to 8.5, expressed in terms of weight percent on the oxide basis.

13. A recording disk substrate as claimed in claim 12, wherein said glass ceramic composition further consists essentially, expressed in terms of weight percent on the oxide basis, of from 0.1 to 5 wt % of CaO.

14. A recording disk substrate as claimed in claim 12, wherein said glass ceramic composition further consists essentially, expressed in terms of weight percent on the oxide basis, of from 0.1 to 5 wt % of $K_2O$.

15. A recording disk substrate as claimed in claim 12, wherein said glass ceramic composition further consists essentially, expressed in terms of weight percent on the oxide basis, of from 0.1 to 5 wt % of $Sb_2O_3$.

16. A recording disk substrate as claimed in claim 12, wherein said glass ceramic composition further consists essentially, expressed in terms of weight percent on the oxide basis, of from 0.1 to 15 wt % of $B_2O_3$.

17. A recording disk substrate as claimed in claim 12, wherein said glass ceramic composition further consists essentially, expressed in terms of weight percent on the oxide basis, of from 0.1 to 12 wt % of MgO.

18. A recording disk substrate as claimed in claim 12, wherein said glass ceramic composition further consists essentially, expressed in terms of weight percent on the oxide basis, of from 0.1 to 5 wt % of BaO.

19. A recording disk substrate as claimed in claim 12, wherein said glass ceramic composition further consists essentially, expressed in terms of weight percent on the oxide basis, of from 0.1 to 5 wt % of ZnO.

20. A recording disk substrate as claimed in claim 12, wherein said glass ceramic composition further consists essentially, expressed in terms of weight percent on the oxide basis, of from 0.1 to 5 wt % of $Nb_2O_5$.

21. A recording disk substrate as claimed in claim 12, wherein said glass ceramic composition further consists essentially, expressed in terms of weight percent on the oxide basis, of from 0.1 to 5 wt % of $Ta_2O_5$.

22. A recording disk substrate as claimed in claim 12, wherein said lass ceramic composition further consists essentially, expressed in terms of weight percent on the oxide basis, of from 0.1 to 5 wt % of $La_2O_3$.

23. A recording disk substrate as claimed in claim 12, wherein the glass ceramic includes crystalline phase of quartz.

24. A recording disk substrate as claimed in claim 12, wherein the glass ceramic includes crystalline phase of lithium disilicate.

25. A recording disk substrate as claimed in claim 12, wherein the recording disk substrate contains a lithium disilicate as a main crystalline phase or subordinate crystalline phase.

* * * * *